(12) United States Patent
Yamamoto et al.

(10) Patent No.: US 10,950,851 B2
(45) Date of Patent: Mar. 16, 2021

(54) ELECTRODE INCLUDING ACTIVE MATERIALS HAVING COAT MATERIALS WITH DIFFERENT ISOELECTRIC POINTS, AND BATTERY USING SAME

(71) Applicant: TOYOTA JIDOSHA KABUSHIKI KAISHA, Toyota (JP)

(72) Inventors: Yuji Yamamoto, Toyota (JP); Ryuta Sugiura, Toyohashi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 132 days.

(21) Appl. No.: 16/370,458

(22) Filed: Mar. 29, 2019

(65) Prior Publication Data

US 2019/0326590 A1 Oct. 24, 2019

(30) Foreign Application Priority Data

Apr. 24, 2018 (JP) .............................. JP2018-083431

(51) Int. Cl.
*H01M 4/36* (2006.01)
*H01M 10/052* (2010.01)

(52) U.S. Cl.
CPC ........... *H01M 4/364* (2013.01); *H01M 4/366* (2013.01); *H01M 10/052* (2013.01)

(58) Field of Classification Search
CPC ..... H01M 4/364; H01M 4/366; H01M 10/052
USPC ........................................................ 429/218.1
See application file for complete search history.

(56) References Cited

U.S. PATENT DOCUMENTS

2002/0071991 A1\* 6/2002 Kweon ................. H01M 4/525
429/231.1
2016/0013480 A1\* 1/2016 Sikha .................... H01M 4/661
427/126.6
2016/0308202 A1\* 10/2016 Kuriyama ............. H01M 4/485

FOREIGN PATENT DOCUMENTS

JP 2006-036545 A 2/2006

\* cited by examiner

*Primary Examiner* — Sean P Cullen
(74) *Attorney, Agent, or Firm* — Oliff PLC (57) ABSTRACT

One aspect of the present invention provides an electrode having a collector and an electrode mix layer disposed on the collector. The electrode mix layer contains an active material A having a core portion A and a coat material A, and an active material B having a core portion B and a coat material B. The isoelectric point of the coat material A is 7 or lower. The isoelectric point of the coat material B is 7 or higher. The isoelectric point of at least one of the coat material A and the coat material B is not 7.

17 Claims, 6 Drawing Sheets

FIG.6

ELECTRODE INCLUDING ACTIVE MATERIALS HAVING COAT MATERIALS WITH DIFFERENT ISOELECTRIC POINTS, AND BATTERY USING SAME

CROSS REFERENCE TO RELATED APPLICATION

This application claims the benefit of priority to Japanese Patent Application No. 2018-083431 filed on Apr. 24, 2018. The entire contents of this application are hereby incorporated herein by reference.

BACKGROUND OF THE DISCLOSURE

1. Field

The present invention relates to an electrode and to a battery using the same.

2. Background

Further improvements in durability in lithium secondary batteries are being addressed as underlying factors of performance improvement. In this regard, for instance Japanese Patent Application Publication No. 2006-036545 discloses: a positive electrode active material in which the surface of a lithium-manganese-nickel complex oxide is coated with a predetermined metal oxide; and a lithium secondary battery using that positive electrode active material. In Japanese Patent Application Publication No. 2006-036545, contact between an electrolyte and the lithium-manganese-nickel complex oxide is reduced by a metal oxide, and side reactions are thus inhibited.

SUMMARY

However, studies by the inventors have showed that the above art still has room for improvement from the viewpoint of increasing input-output density. Specifically, in the art of Japanese Patent Application Publication No. 2006-036545 the surface of an active material is coated with a metal oxide. An inert portion becomes larger as a result at the surface of the active material. This was problematic in that, in consequence, internal resistance increases, and the input-output characteristic of the battery was poor.

It is an object of the present invention, arrived at in order to solve the above problem, to provide an electrode that allows producing a battery having a superior input characteristic and/or superior output characteristic. A related object is to provide a battery having a superior input characteristic and/or superior output characteristic.

In one aspect, the present invention provides an electrode that is provided with a collector and with an electrode mix layer disposed on the collector. The electrode mix layer contains an active material A provided with a core portion A and a coat material A disposed on a surface of the core portion A, and an active material B provided with a core portion B and a coat material B disposed on a surface of the core portion B. The coat material A has an isoelectric point, based on an electrophoretic method, of 7 or lower; the isoelectric point of the coat material B is 7 or higher; and the isoelectric point of at least one of the coat material A and the coat material B is not 7.

The electrode contains both active materials A, B having mutually different surface charge, and thus charge in the interior of the electrode is nonuniform. Charge carrier ions are readily drawn as a result towards the electrode. Further, the affinity between the charge carrier ions and the electrode becomes higher, and the wettability of the electrolyte towards the electrode is enhanced. As a result it becomes possible to realize a battery having a superior input characteristic and/or superior output characteristic, thanks to a reduction in electrode resistance.

In one aspect of the electrode disclosed herein, when dividing the electrode mix layer in two in a thickness direction, into a lower layer portion on a side close to the collector and an upper layer portion on a surface side away from the collector, the lower layer portion contains more of the active material B than of the active material A, and the upper layer portion contains more of the active material A than of the active material B. As a result, cationic charge carrier ions are drawn strongly towards the surface of the electrode mix layer. In consequence, internal resistance can be reduced to a great extent, and it becomes thus possible to achieve a yet better input characteristic and/or output characteristic.

In one aspect of the electrode disclosed herein, when dividing the electrode mix layer in three in a thickness direction, into a first layer, a second layer and a third layer, sequentially from a side close to the collector, and when P1 represents a total of outer peripheral lengths of the active materials B included in the first layer, and P3 represents a total of outer peripheral lengths of the active materials B included in the third layer, the P1 and the P3 satisfy the following expression: $1 \leq (P1/P3) \leq 4$. As a result, cationic charge carrier ions are drawn strongly towards the surface of the electrode mix layer. In consequence, internal resistance can be reduced to a great extent, and it becomes thus possible to achieve yet better input characteristic and/or output characteristic.

In one aspect of the electrode disclosed herein, a difference between the isoelectric point of the coat material A and the isoelectric point of the coat material B is 4 or greater. Charge nonuniformity in the interior of the electrode becomes higher as a result. In consequence, the effect of the art disclosed herein can be brought out at a high level, and the input characteristic and/or output characteristic can be better enhanced.

In one aspect of the electrode disclosed herein, the isoelectric point of the coat material A is 5 or lower. Charge nonuniformity in the interior of the electrode becomes higher as a result. In consequence, the effect of the art disclosed herein can be brought out at a high level, and the input characteristic and/or output characteristic can be better enhanced.

In one aspect of the electrode disclosed herein, an average particle size Da of the active material A and an average particle size Db of the active material B satisfy the following expression: $1 \leq (Db/Da) \leq 2$. An electrode can be easily achieved as a result in which the active material A is unevenly distributed towards the surface.

In a further aspect, the present invention provides a battery having the above electrode. Such a battery boasts a superior input characteristic and/or superior output characteristic.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be explained below with reference to accompanying drawings. Any features (for example, further battery constituent elements and ordinary production processes of batteries, not being characterizing features of the present invention) other than the matter specifically set forth in the present specification (for instance, composition and properties of active materials A, B) and that may be necessary for carrying out the present invention can be regarded as design matter for a person skilled in the art based on conventional art in the relevant technical field. The present invention can be realized on the basis of the disclosure of the present specification and common technical knowledge in the relevant technical field. In the present specification a numerical value range notated as "A to B" (where A and B are arbitrary numerical values) denotes a value equal to or larger than A and equal to or smaller than B.

In the drawings below, members and portions that elicit identical effects are denoted with identical reference numerals, and a recurrent explanation thereof may be omitted or simplified. The dimensional relationships (length, width, thickness and so forth) in the figures do not necessarily reflect actual dimensional relationships. The reference symbol X in the figures denotes the thickness direction of a positive electrode mix layer. However, this is merely a direction for convenience of explanation, and the manner in which electrodes are arranged is not limited in any way.

First Embodiment

Positive Electrode for Batteries

Figure 1:
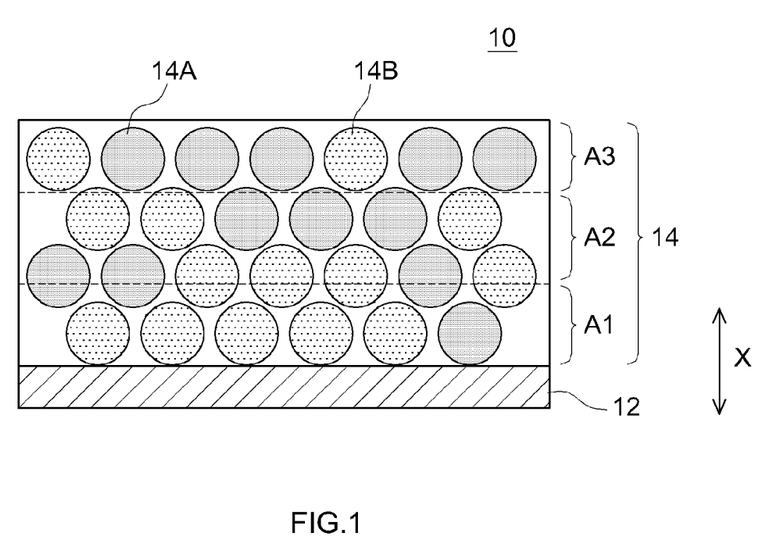
FIG. 1 is a schematic cross-sectional diagram of a positive electrode according to an embodiment.

FIG. 1 is a schematic cross-sectional diagram of a positive electrode 10 according to an embodiment. The positive electrode 10 is an example of an electrode. Although not meant as a particular limitation, the art disclosed herein will be explained in concrete terms in the present embodiment taking the positive electrode 10 as an example.

The positive electrode 10 is a member that is used as a positive electrode of a battery. The positive electrode 10 has a collector 12 and a positive electrode mix layer 14 fixed on (typically the surface of) the collector 12. In the present embodiment the positive electrode 10 is made up of a collector 12 and the positive electrode mix layer 14, but the positive electrode 10 may have other layers. For instance the positive electrode 10 may have a conductive layer or plating layer between the collector 12 and the positive electrode mix layer 14. The positive electrode mix layer 14 may be fixed to just one surface of the collector 12, or may be fixed to both surfaces. The various constituent elements will be explained in turn below.

The collector 12 is a conductive member. The collector 12 is a member electrically connected to a positive electrode terminal (not shown) for external connection. Although not particularly limited thereto, the collector 12 is typically made of a metal having good conductivity, for instance Al, Ti, Cr, Fe, Ni, Cu, Zn, Ag, Pt, Au or stainless steel (SUS). The collector 12 may for instance be an aluminum-made collector made of aluminum or of an alloy (aluminum alloy) having aluminum as a main component. The collector 12 may be for instance foil-shaped, mesh-shaped, rod-shaped or plate-shaped.

The positive electrode mix layer 14 contains at least two types of positive electrode active material, namely positive electrode active materials 14A, 14B. The positive electrode active materials 14A, 14B are examples of active materials A, B. The positive electrode active materials 14A, 14B have mutually different surface charges. The positive electrode mix layer 14 has a charge distribution as a result. In other words, the charge in the positive electrode mix layer 14 is nonuniform. Although not illustrated in the figures, the positive electrode active material 14A, which is in particulate form, contains a positive electrode core portion A and a coat material A disposed on the surface of the positive electrode core portion A. The positive electrode active material 14B, which is in particulate form, contains a positive electrode core portion B and a coat material B disposed on the surface of the positive electrode core portion B. The positive electrode active materials 14A, 14B are typically composite particles. The positive electrode core portions A, B are portions constituting the cores of the positive electrode active materials 14A, 14B, respectively. The coat materials A, B are disposed on the surfaces of the positive electrode active materials 14A, 14B, respectively.

The coat materials A, B are adhered physically and/or chemically to the surfaces of the positive electrode core portions A, B, respectively. That is, the positive electrode core portion A and the coat material A are adhered integrally to each other in the positive electrode active material 14A. The positive electrode core portion B and the coat material B are adhered integrally to each other in the positive electrode active material 14B. As a result, the effect of the art disclosed herein can be brought out at a higher level as compared with an instance where the positive electrode core portions A, B and the coat materials A, B are respectively present as separate and independent particles. In other words, the diffusion resistance of the positive electrode mix layer 14 can be kept low. The coat materials A, B may be for instance sintered compacts that are sintered on the surfaces of the positive electrode core portions A, B.

The coat materials A, B may be disposed so as to cover the entire surfaces of the positive electrode core portions A, B, or may be disposed so as to cover only part of the surfaces of the positive electrode core portions A, B. The coat materials A, B may be disposed so as to cover about half or more of the entire surface area of the positive electrode core portions A, B, and typically so as to cover 80% or more of the surface area, for instance 90% or more of the surface area. The coat materials A, B may be disposed so as to cover the surfaces of the positive electrode core portions A, B in a dotted (island-like) pattern.

The positive electrode core portions A, B contain at least a material capable of reversibly storing and releasing a charge carrier (for instance lithium, in a lithium battery). The positive electrode core portions A, B may each be made up of only a material capable of reversibly storing and releasing a charge carrier, and may further contain for instance a conductive material. As the materials capable of reversibly storing and releasing charge carriers there can be selected and used one or two or more conventionally used materials, without particular limitations. The positive electrode core portions A, B may be made of the same material, or may be made of different materials. Although not particularly limited thereto, the materials of the positive electrode core portions A, B may be for instance compounds (lithium-transition metal complex oxides) that contain lithium and one or two or more transition metal elements.

The lithium-transition metal complex oxide may contain one or two or more types of transition metal elements from among Ni, Co and Mn. Concrete examples of lithium-transition metal complex oxides include for instance lithium-nickel-containing complex oxides, lithium-cobalt-containing complex oxides, lithium-manganese-containing complex oxides, lithium-nickel-manganese-containing complex oxides, lithium-nickel-cobalt-manganese-containing complex oxides and lithium-nickel-cobalt-aluminum-containing complex oxides. The lithium-transition metal complex oxide may be a lithium-nickel-cobalt-manganese-containing complex oxide, by virtue of the superior output characteristic and high-rate cycle characteristic that such a complex oxide affords.

The coat materials A, B may be made up of materials having mutually different isoelectric points. The coat materials A, B may contain for instance mutually different elements (for instance metal elements). Hereafter the isoelectric point of the coat material A will be referred to as Ia and the isoelectric point of the coat material B will be referred to as Ib. In the present specification, the term "isoelectric point" denotes the value of a hydrogen index (pH) at which the charge (net charge) at the surface of the coat material is apparently 0 (zero) through balancing of the positive charge and the negative charge upon a change in the hydrogen ion concentration in a dispersion that contains the coat material. The isoelectric point can be measured for instance in accordance with an electrophoretic method using an ordinary zeta potential measuring device. Specifically, firstly 0.1 parts by mass of a coat material is added to pure water (100 parts by mass) in an environment at 25° C., with stirring, to prepare a dispersion. Next, the hydrogen ion concentration of the dispersion is modified using sodium hydroxide and hydrochloric acid, to gradually lower the pH of the dispersion from 14 towards 0. The zeta potential at each pH is measured using a zeta potential measuring device. Next, the zeta potential at each pH is plotted as a graph with zeta potential in the vertical axis and pH in the horizontal axis. The value of pH for which zeta potential is 0 is taken as the isoelectric point.

The coat material A makes up the positive electrode active material 14A. The coat material A is disposed on the surface of the positive electrode core portion A, and is in contact with the positive electrode core portion A. In a case where the below-described coat material B is charged, the coat material A is a material having an isoelectric point Ia, measured in accordance with an electrophoretic method, of 7 or lower. In a case where the below-described coat material B is not charged, the coat material A is a material having an isoelectric point Ia, measured in accordance with an electrophoretic method, in excess of 7. In other words, in a case where the below-described coat material B is charged, the coat material A is an uncharged material or is a negatively charged material. In a case where the below-described coat material B is uncharged, the coat material A is a negatively charged material. As the coat material A there can be selected and used as appropriate one or two or more types of material selected from among conventionally used coat materials, without particular limitations, so long as the isoelectric point Ia of the coat material is 7 or lower. The coat material A may be for instance an acidic compound that generates hydrogen when ionized. The coat material A may be an inorganic compound or an organic compound. Typical examples of the coat material A include oxides, complex oxides, nitrides and sulfides of various metals and metalloids. Among the foregoing, the coat material preferably contains an oxide.

The coat material A has preferably a low isoelectric point Ia. The isoelectric point Ia of the coat material A may be for instance lower than those of the constituent materials of the core portion A. The isoelectric point Ia of the coat material A may be for instance lower than 7, and preferably 5 or lower, or 4 or lower, and further 2 or lower. Nonuniformity of charge in the positive electrode mix layer 14 can be better increased as a result. The isoelectric point Ia of the coat material A is for instance higher than 0, and may be 0.1 or higher, or 0.5 or higher. Examples of the coat material A include tungsten oxide, silicon oxide, vanadium oxide, tantalum oxide and titanium oxide.

Although not particularly limited thereto, concrete examples of the coat material A (and isoelectric point Ia thereof) include $WO_3$ (isoelectric point Ia: 0.5), $SiO_2$ (isoelectric point Ia: 2), $V_3O_8$ (isoelectric point Ia: 4), $Ta_2O_5$ (isoelectric point Ia: 5) and $TiO_2$ (isoelectric point Ia: 7). Preferred among the foregoing are $WO_3$, $SiO_2$, $V_3O_8$ and $Ta_2O_5$, more preferably $WO_3$, $SiO_2$ and $V_3O_8$, and particularly preferably $WO_3$, by virtue of having a low isoelectric point Ia.

The coat material B makes up the positive electrode active material 14B. The coat material B is disposed on the surface of the positive electrode core portion B, and is in contact with the positive electrode core portion B. In a case where the coat material A is charged, the coat material B is a material having an electrophoretic method-based isoelectric point Ib of 7 or higher. In a case where the coat material A is uncharged, the coat material B is a material having an electrophoretic method-based isoelectric point Ib lower than 7. In other words, in a case where the coat material A is charged, the coat material B is an uncharged material or is a positively charged material. In a case where the coat material A is uncharged, the coat material B is a positively charged material. As the coat material B there can be selected and used as appropriate one or two or more types of material selected from among conventionally used coat materials, without particular limitations, so long as the isoelectric point Ib of the coat material is 7 or higher. The coat material B may be for instance a basic compound that generates hydroxyl groups when ionized. The coat material B may be an inorganic compound or an organic compound. Typical examples of the coat material B include oxides, complex oxides, hydroxides, nitrides and sulfides of various metals and metalloids. Among the foregoing the coat material B contains preferably an oxide and/or a hydroxide. The coat material B may be in a hydrate state.

The isoelectric point Ib of the coat material B is preferably high. The isoelectric point Ib of the coat material B may be higher than those of the constituent materials of the core portion B. The isoelectric point Ib of the coat material B is for instance higher than 7, preferably 8 or higher, or 9 or higher, and may further be 10 or higher. Nonuniformity of charge in the positive electrode mix layer 14 can be better increased as a result. The isoelectric point Ib of the coat material B may be for instance lower than 13, and may be 12 or lower, or 11 or lower. Examples of the coat material B include for instance niobium oxide, aluminum oxide, yttrium oxide, thorium oxide, beryllium oxide, copper oxide, zinc oxide, cadmium oxide, aluminum hydroxide, boehmite, copper hydroxide, cadmium hydroxide, nickel hydroxide and magnesium hydroxide.

Although not particularly limited thereto, concrete examples (and isoelectric points Ib thereof) of the coat material B include $Nb_2O_3$ (isoelectric point Ib: 8), $Al_2O_3$ (isoelectric point Ib: 9), $Y_2O_3$ (isoelectric point Ib: 9), $ThO_2$ (isoelectric point Ib: 9), BeO (isoelectric point Ib: 10), CuO (isoelectric point Ib: 10), ZnO (isoelectric point Ib: 10), CdO (isoelectric point Ib: 10), AlOOH (isoelectric point Ib: 7.7), $Cu(OH)_2$ (isoelectric point Ib: 8), $Cd(OH)_2$ (isoelectric point Ib: 11), $Ni(OH)_2$ (isoelectric point Ib: 11) and $Mg(OH)_2$ (isoelectric point Ib: 12). Preferred among the foregoing are $Al_2O_3$, BeO, CuO, ZnO, CdO, $Cd(OH)_2$, $Ni(OH)_2$, $Mg(OH)_2$ and more preferably BeO, CuO, ZnO, CdO, $Cd(OH)_2$, $Ni(OH)_2$ and $Mg(OH)_2$, by virtue of having a high isoelectric point Ib. Preferably, the coat material B is an oxide or hydroxide of aluminum, and particularly preferably $Al_2O_3$, for instance from the viewpoint of availability, handleability and cost.

In one aspect, a difference between the isoelectric point Ia of the coat material A and the isoelectric point Ib of the coat material B, i.e. |Ib−Ia|, is about 1 or greater, preferably 2 or greater, more preferably 4 or greater, particularly preferably 5 or greater, for instance 7 or greater, and further 9.5 or greater. Nonuniformity of charge in the positive electrode mix layer 14 can be better increased thereby. As a result it becomes possible to bring out the effect of the art disclosed herein at a high level, and to achieve a battery of yet higher output density. Herein may be for instance 12 or smaller, or 11.5 or smaller, or further 10.5 or smaller.

The positive electrode active materials 14A, 14B in the present embodiment are particulate materials. Although not particularly limited thereto, the average particle sizes of the positive electrode active materials 14A, 14B may be about 1 μm or larger, for instance 5 μm or larger. The average particle sizes of the positive electrode active materials 14A, 14B may be about 30 μm or smaller, typically 20 μm or smaller, for instance 10 μm or smaller, from the viewpoint of forming a dense and homogeneous positive electrode mix layer 14. The term "average particle size" in the present specification denotes a particle size corresponding to a cumulative 50%, from the small particle size side, in a volume-basis particle size distribution obtained in a particle size distribution measurement in accordance with a laser diffraction/light scattering method.

In one aspect, an average particle size Da of the positive electrode active material 14A and an average particle size Db of the positive electrode active material 14B are different from each other. The average particle size Db of the positive electrode active material 14B may be equal to or greater than the average particle size Da of the positive electrode active material 14A, for instance may be 1.5 times or more the average particle size Da of the positive electrode active material 14A, and may be less than about 3 times, for instance 2 times or less, the average particle size Da of the positive electrode active material 14A. In other words, the average particle size Da of the positive electrode active material 14A and the average particle size Db of the positive electrode active material 14B preferably satisfy the following expression: $1 \leq (Db/Da) < 3$, and more preferably the following expression: $1 \leq (Db/Da) \leq 2$. As an example, Da and Db satisfy the following expression: $1.5 \leq (Db/Da) \leq 2$. As a result it becomes possible to suitably realize a positive electrode mix layer 14 such as the one of the present embodiment.

Although not particularly limited thereto, the mass ratio of the coat material A in the positive electrode active material 14A may be about 10 parts by mass or less, typically 5 parts by mass or less, for instance 3 parts by mass or less, further 2 parts by mass or less, and in an example, 1 part by mass or less, with respect to 100 parts by mass as the positive electrode core portion A. By prescribing the mass ratio of the coat material A to be equal to or smaller than a predetermined value it becomes possible to increase relatively the proportion of the positive electrode core portion A in the positive electrode active material 14A, and to suitably achieve thereby a battery of high energy density. The mass ratio of the coat material A in the positive electrode active material 14A may be about 0.01 parts by mass or more, typically 0.1 parts by mass or more, and for instance 0.5 parts by mass or more, with respect to 100 parts by mass as the positive electrode core portion A. By prescribing the mass ratio of the coat material A to be equal to or larger than a predetermined value, the effect of the art disclosed herein can be brought out at a high level, and a battery of high power density can be achieved yet more suitably.

Although not particularly limited thereto, the mass ratio of the coat material B in the positive electrode active material 14B may be about 10 parts by mass, typically 5 parts by mass or less, for instance 3 parts by mass or less, further 2 parts by mass or less, and in an example, 1 part by mass or less, with respect to 100 parts by mass as the positive electrode core portion B. By prescribing the mass ratio of the coat material B to be equal to or smaller than a predetermined value it becomes possible to increase relatively the proportion of the positive electrode core portion B in the positive electrode active material 14B, and to suitably achieve thereby a battery of high energy density. The mass ratio of the coat material B in the positive electrode active material 14B may be about 0.01 parts by mass or more, typically 0.1 parts by mass or more, and for instance 0.5 parts by mass or more, with respect to 100 parts by mass as the positive electrode core portion B. By prescribing the mass ratio of the coat material B to be equal to or larger than a predetermined value, the effect of the art disclosed herein can be brought out at a high level, and a battery of high power density can be achieved yet more suitably.

Although not particularly limited thereto, the content ratio of the positive electrode active materials 14A, 14B in the positive electrode mix layer 14 may lie in the range of about 1:10 to 10:1, typically 1:5 to 5:1, and further 1:3 to 3:1, for instance 1:2 to 2:1.

The positive electrode active materials 14A, 14B such as the above can be produced in accordance with a production method that includes a step of causing the coat materials A, B to deposit on the surfaces of the positive electrode core portions A, B, respectively. Methods that can be appropriately resorted to deposit the coat materials A, B on the surfaces of the positive electrode core portions A, B include dry mixing methods (solid phase methods), wet mixing methods (liquid phase methods), sputtering, pulsed laser deposition (PLD), chemical vapor deposition (CVD), vacuum deposition and electrostatic spraying. In a case where for instance a dry method is resorted to, the constituent materials of the positive electrode core portion A and the coat material A may be mixed, and be subjected to a mechano-chemical treatment, followed by a thermal treatment for instance at a temperature of about 500° C. to 1000° C. The constituent materials of the positive electrode core portion B and the coat material B may be mixed in particulate form, and the resulting mixture be subjected to a thermal treatment for instance at a temperature of about 500° C. to 1000° C. As a result there can be produced the positive electrode active material 14A in which the coat material A is sintered on the surface of the positive electrode core portion A and the positive electrode active material 14B in which the coat material B is sintered on the surface of the positive electrode core portion B.

Other than the positive electrode active materials 14A, 14B, the positive electrode mix layer 14 may contain for instance arbitrary components such as a conductive material, a binder or a dispersant. Examples of the conductive material include carbon materials such as carbon black, and typically acetylene black or Ketjen black. Examples of the binder include acrylic resins obtained using monomers having a (meth)acryloyl group (for instance acrylic acid, methacrylic acid, acrylamide or methacrylic amide), and halogenated vinyl resins such as polyvinylidene fluoride (PVdF).

Preferably the positive electrode mix layer 14 has high affinity to electrolytes for batteries. For instance, a contact angle σ of a droplet of electrolyte dropped on the surface of the positive electrode mix layer 14 is preferably small. The contact angle σ is typically smaller than 60°, and may be about 55° or smaller, preferably 50° or smaller, more preferably 40° or smaller, particularly preferably 30° or smaller, and for instance 20° or smaller. As a result there increases the wettability of the electrolyte towards the positive electrode mix layer 14. That is, the affinity of the positive electrode mix layer 14 towards the electrolyte is enhanced. In consequence it becomes possible to better reduce interface resistance between the positive electrode 10 and the electrolyte. The contact angle σ may be for instance 10° or larger, or 15° or larger, or 17° or larger. In the present specification, the term "contact angle" denotes a value obtained through measurement according to "6. Sessile Drop Method" of the "Testing Method of Wettability of Glass Substrates" described in Japanese Industrial Standard JIS R3257 (1999), using herein a liquid electrolyte (electrolyte solution) instead of water.

In the present embodiment, the positive electrode mix layer 14 contains the positive electrode active material 14A and the positive electrode active material 14B at a lower layer portion and at an upper layer portion, respectively, that result from dividing in two (for instance equally dividing in two) the positive electrode mix layer 14 in the thickness direction X, the side closer to the collector 12 being herein the lower layer portion, and the side further away from the collector 12 (surface side of the positive electrode mix layer 14) being the upper layer portion. The lower layer portion may contain more positive electrode active material 14B than positive electrode active material 14A, for instance on the basis of surface area in a SEM observation image. The upper layer portion may contain more positive electrode active material 14A than positive electrode active material 14B, for instance on the basis of surface area in a SEM observation image. In other words, the positive electrode active material 14B may be unevenly distributed towards the lower layer portion. The positive electrode active material 14A may be unevenly distributed towards the upper layer portion. In a case where the charge carrier ions are cations, the charge carrier ions can be strongly attracted to the positive electrode mix layer 14 through an increase in the proportion of the positive electrode active material 14A in the upper layer portion. Therefore, the effect of the art disclosed herein can be brought out at a higher level.

In the present embodiment, as illustrated in FIG. 1, the positive electrode mix layer 14 is divided in three (for instance divided in three equal portions) in the thickness direction X, into a first layer A1, a second layer A2 and a third layer A3, from the side close to the collector 12, such that the first layer A1, the second layer A2 and the third layer A3 each contains the positive electrode active material 14A and the positive electrode active material 14B. Herein the following relationship: 1≤(P1/P3)≤4 is preferably satisfied, and likewise the following relationship: 2≤(P1/P3)≤4 is preferably satisfied, where P1 is the total of outer peripheral lengths (total outer peripheral distance) of the positive electrode active materials 14B included in the first layer A1, and P3 is the total of outer peripheral lengths (total outer peripheral distance) of the positive electrode active materials 14B included in the third layer A3. The proportion of positive electrode active material 14A is rendered relatively higher at the third layer A3 (surface side of the positive electrode mix layer 14), through an increase in the proportion of the positive electrode active material 14B at the first layer A1 close to the collector 12. As a result, charge carrier ions are strongly attracted to the positive electrode mix layer 14, in a case where the charge carrier ions are cations. The effect of the art disclosed herein can therefore be brought out at a higher level. The way in which the total outer peripheral distances P1, P3 are worked out will be explained in detail in the below-described examples.

The positive electrode mix layer 14 in which the positive electrode active material 14A is thus unevenly distributed towards the surface portion of the positive electrode mix layer 14, for instance the upper layer portion or the first layer A1, can be produced in accordance with a production method that includes steps S1 to S3 below.

Specifically, firstly there is prepared a positive electrode slurry containing the positive electrode active materials 14A, 14B (step S1). The positive electrode slurry can be prepared for instance using a conventionally known kneading device such as a planetary mixer or a disper mixer. The average particle sizes of the positive electrode active materials 14A, 14B may each be set to lie in the above ranges. The average particle size Da of the positive electrode active material 14A and the average particle size Db of the positive electrode active material 14B may satisfy the following expression: Da≤Db≤2×Da.

The positive electrode slurry is next applied to the surface of the collector 12 (step S2). The positive electrode slurry may be applied using for instance a conventionally known coating device such as a die coater, a slit coater or a comma coater.

The positive electrode slurry applied to the surface of the collector 12 is dried next (step S3). The positive electrode slurry can be dried for instance using a drying apparatus such as a heat drying apparatus, a vacuum drying apparatus, or using dry air, with the involved operations of heating, pressure-reduction, blowing and so forth being carried out singly or in appropriate combinations. Heating may be carried out typically at 200° C. or below, for instance at a temperature in the range of 80° C. to 150° C. When there is a difference between the average particle size Da of the positive electrode active material 14A and the average particle size Db of the positive electrode active material 14B, a trend is observed whereby the positive electrode active material of relatively larger particle size settles and becomes unevenly distributed towards the vicinity of the collector 12. By contrast, the positive electrode active material of relatively smaller particle size tends to float up and become unevenly distributed towards the surface portion of the positive electrode mix layer 14. Therefore, a production method including steps S1 to S3 such as those above allows producing a positive electrode mix layer 14 in which the positive electrode active material 14A is thus unevenly distributed towards the surface portion of the positive electrode mix layer 14, for instance the upper layer portion or the third layer A3.

Battery

The positive electrode of the first embodiment can be used to construct a battery. In the present specification, the term "battery" encompasses primary batteries, as well as storage batteries (secondary batteries) capable of being used repeatedly, as well as electric storage devices in general. The secondary battery may be for instance a lithium secondary battery, a nickel-hydride battery, a lithium ion capacitor or an electrical double layer capacitor. In the art disclosed herein, the battery is provided with the positive electrode 10, a negative electrode and an electrolyte.

The negative electrode of the battery is not particularly limited and may be similar to conventional ones. The negative electrode has typically a collector and a negative electrode mix layer fixed to the collector. The collector is a conductive member. The collector is a member electrically connected to a negative electrode terminal for external connection. The negative electrode mix layer contains at least a negative electrode active material. The negative electrode active material is a material capable of reversibly storing and releasing charge carriers. One, two or more materials from among materials conventionally used can be selected and used, without particular limitations, as the negative electrode active material. The negative electrode active material may be for instance a carbon material such as graphite. Besides the negative electrode active material, the negative electrode mix layer may contain arbitrary components, for instance a binder and a thickener. Examples of binders include for instance rubbers such as styrene butadiene rubber (SBR), and halogenated vinyl resins such as polyvinylidene fluoride (PVdF). Examples of thickeners include celluloses such as carboxymethyl cellulose (CMC).

The electrolyte of the battery is not particularly limited and may be similar to conventional ones. The electrolyte is typically an electrolyte solution in liquid state at room temperature (25° C.). The electrolyte typically contains a supporting salt and a solvent. The electrolyte is for instance a nonaqueous electrolyte solution containing a supporting salt and a nonaqueous solvent. Other than in liquid form, the electrolyte may be also for instance in gel form, sol form or solid form. The supporting salt generates charge carrier ions through decomposition in the solvent. In a lithium battery, for instance, the supporting salt generates lithium ions. The charge carrier ions are typically cations such as lithium ions, calcium ions or magnesium ions, but may be for instance anions such as fluoride ions. Concrete examples of the supporting salt include for instance fluorine-containing lithium salts such as $LiPF_6$ and $LiBF_4$. Typical examples of the solvent include nonaqueous solvents, for instance aprotic solvents such as carbonates, ethers, esters, nitriles, sulfones and lactones. In addition to the supporting salt and the solvent, the electrolyte may also contain arbitrary additional components, for instance film forming agents such as lithium bis(oxalato)borate (LiBOB) and vinylene carbonate (VC), and gas generating agents such as biphenyl (BP) and cyclohexylbenzene (CHB).

The resistance of the positive electrode mix layer 14 can be reduced in a battery having the above configuration, and thus a battery can be realized that boasts a superior output characteristic. Specifically, the positive electrode 10 contains the positive electrode active materials 14A, 14B having different surface charge states, in the positive electrode mix layer 14. Charge in the interior of the positive electrode mix layer 14 is therefore uneven. As a result, a voltage gradient arises for instance in a direction from the electrolyte towards the positive electrode mix layer 14, whereby charge carrier ions (for instance lithium ions in a lithium battery) are readily drawn towards the positive electrode mix layer 14. In consequence there increases for instance the movement speed of charge carrier ions during intercalation for the charge carrier ions into the core portions A, B of the positive electrode active materials 14A, 14B. Further, the affinity between the charge carrier ions and the positive electrode mix layer 14 is increased, and the wettability of the electrolyte towards the positive electrode mix layer 14 is improved. Thanks to the above effect, the art disclosed herein allows realizing a battery of relatively lower resistance, while boasting a superior output characteristic, as compared with a case where the positive electrode mix layer 14 contains only the positive electrode active material 14A, or the positive electrode mix layer 14 contains only the positive electrode active material 14B.

Uses of Battery

The battery provided with the positive electrode 10 can be used in various applications, and has a better output characteristic than conventional products. By drawing on such a characterizing feature, therefore, the battery disclosed herein can be preferably used for instance in applications where high power density is required. Specifically, the battery can be preferably used as a power source (drive power source) for motors installed in vehicles. The type of vehicle is not particularly limited, and typical examples include automobiles, for instance plug-in hybrid vehicles (PHV), hybrid vehicles (HV) and electric vehicles (EV). The battery may be used in the form of an assembled battery resulting from series and/or parallel connection of a plurality of batteries.

Figure 2:
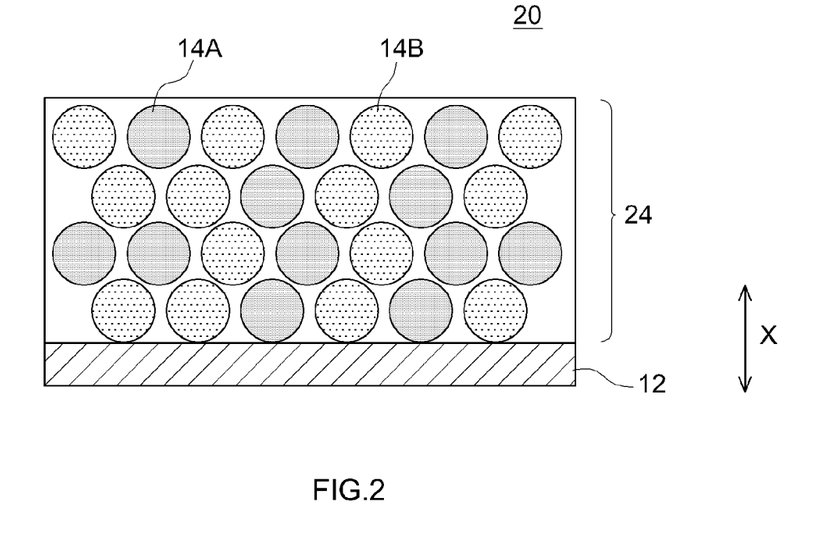
FIG. 2 is a schematic cross-sectional diagram of a positive electrode according to another embodiment.

In the positive electrode 10 illustrated in FIG. 1 the positive electrode active material 14B is unevenly distributed towards the surface portion of the positive electrode mix layer 14, but the configuration of the positive electrode 10 is not limited thereto. FIG. 2 is a schematic cross-sectional diagram of a positive electrode 20 according to another embodiment. In the positive electrode 20, the positive electrode active materials 14A, 14B are disposed substantially evenly in the thickness direction X of a positive electrode mix layer 24. Such a positive electrode 20 can be used in the same way as the positive electrode 10.

Second Embodiment

Negative Electrode for Batteries

In the first embodiment the art disclosed herein is applied to positive electrodes 10, 20, but is not limited thereto. The electrode disclosed herein may also be a negative electrode for batteries. The configurations of the negative electrode of the second embodiment and of a battery provided with the negative electrode may be identical to those of the first embodiment above, except for the features expounded below. In a case where the art disclosed herein is to be adapted to a negative electrode, the above disclosure relating to the positive electrode of the first embodiment can be relied upon, as appropriate, concerning also the negative electrode.

The negative electrode disclosed herein has a collector and a negative electrode mix layer fixed on (typically the surface of) the collector. The collector may be similar to that of the first embodiment. The collector may be a copper-made collector made of copper or out of an alloy (copper alloy) having copper as a main constituent. The negative electrode mix layer contains at least two types of negative electrode active material, i.e. negative electrode active materials A, B. The negative electrode active materials A, B have mutually different surface charges. The negative electrode mix layer has a charge distribution as a result. The negative electrode active material A, which is in particulate form, contains a negative electrode core portion A and a coat material A disposed on the surface of the negative electrode core portion A. The negative electrode active material B, which is in particulate form, contains a negative electrode core portion B and a coat material B disposed on the surface of the negative electrode core portion B. The configuration and properties of the negative electrode mix layer may be similar to those of the first embodiment, except for the features of the negative electrode core portions A, B.

The negative electrode core portions A, B contain at least a material capable of reversibly storing and releasing a charge carrier (for instance lithium, in a lithium battery). The negative electrode core portions A, B may each be made up of only a material capable of reversibly storing and releasing a charge carrier, or may further contain for instance a conductive material. As the materials capable of reversibly storing and releasing charge carriers, there can be selected and used one or two or more conventionally used materials, without particular limitations. The negative electrode core portions A, B may be made of the same material, or may be made of different materials. Although not particularly limited thereto, the materials of the negative electrode core portions A, B may be for instance a carbon material such a graphite, hard carbon or soft carbon; a lithium-transition metal complex oxide such as lithium titanate; a lithium-transition metal complex nitride; or a silicon compound containing Si.

Battery

In a battery provided with the negative electrode of the second embodiment, the positive electrode is not particularly limited and may be similar to conventional positive electrodes. The positive electrode may be for instance the positive electrode 10, 20 of the first embodiment, or may be similar to a conventional positive electrode. In other words, the positive electrode may for instance contain positive electrode active materials A, B having different surface charge states, or may contain just one type of positive electrode active material alone. The positive electrode may for instance contain just a lithium-transition metal complex oxide not coated with a coat material.

Various examples relating to the present invention will be explained below, but the invention is not meant to be limited to such examples.

Test Example I: Positive Electrode for Batteries

Preparation of Positive Electrode Active Material

In Comparative example 1, $LiNi_{1/3}Co_{1/3}Mn_{1/3}O_2$ (average particle size 10 μm) was prepared as a positive electrode active material. In Comparative example 1, $LiNi_{1/3}Co_{1/3}Mn_{1/3}O_2$ was used, as it was, as the positive electrode active material. In Comparative example 2, firstly $LiNi_{1/3}Co_{1/3}Mn_{1/3}O_2$ (average particle size 10 μm) and $Al_2O_3$ (isoelectric point: 9) were mixed at a mass ratio of 100:0.5, and the mixture was subjected to a mechano-chemical treatment followed by heating at 500° C. for 10 hours. As a result there was produced $LiNi_{1/3}Co_{1/3}Mn_{1/3}O_2$ having the surface thereof coated with $Al_2O_3$. This coated $LiNi_{1/3}Co_{1/3}Mn_{1/3}O_2$ was used in Comparative example 2 as a positive electrode active material.

In Examples 1 to 17, firstly $LiNi_{1/3}Co_{1/3}Mn_{1/3}O_2$ (average particle size 10 μm) and each coat material A given in Table 1 were mixed to a mass ratio of 100:0.5, and the respective mixtures were subjected to a mechano-chemical treatment, followed by heating at 500° C. for 10 hours. As a result there were produced respective positive electrode active materials A. Next, $LiNi_{1/3}Co_{1/3}Mn_{1/3}O_2$ (average particle size 10 μm) and each coat material B given in Table 1 were mixed to a mass ratio of 100:0.5, and the respective mixtures were subjected to a mechano-chemical treatment, followed by heating at 500° C. for 10 hours. As a result there were produced respective positive electrode active materials B. In Examples 1 to 17 the respective positive electrode active materials A, B produced above were mixed at a mass ratio of 1:1, and the resulting mixtures were used as positive electrode active materials.

TABLE 1

| | Coat material A | | Coat material B | | | Evaluation results | |
|---|---|---|---|---|---|---|---|
| | Type | Isoelectric point Ia | Type | Isoelectric point Ib | Isoelectric point difference \|Ib − Ia\| | Contact angle σ (°) | IV resistance (relative value) |
| Ex. 1 | $WO_3$ | 0.5 | $Al_2O_3$ | 9 | 8.5 | 20 | 75 |
| Ex. 2 | $SiO_2$ | 2 | $Al_2O_3$ | 9 | 7 | 30 | 80 |
| Ex. 3 | $V_3O_8$ | 4 | $Al_2O_3$ | 9 | 5 | 35 | 82 |
| Ex. 4 | $Ta_2O_5$ | 5 | $Al_2O_3$ | 9 | 4 | 40 | 85 |
| Ex. 5 | $TiO_2$ | 7 | $Al_2O_3$ | 9 | 2 | 50 | 95 |
| Ex. 6 | $WO_2$ | 0.5 | $Nb_2O_5$ | 8 | 7.5 | 25 | 75 |
| Ex. 7 | $WO_3$ | 0.5 | AlOOH | 7.7 | 7.2 | 28 | 78 |
| Ex. 8 | $WO_3$ | 0.5 | BeO | 10 | 9.5 | 17 | 67 |
| Ex. 9 | $WO_3$ | 0.5 | CdO | 10 | 9.5 | 17 | 67 |
| Ex. 10 | $WO_3$ | 0.5 | $Cd(OH)_2$ | 11 | 10.5 | 15 | 65 |
| Ex. 11 | $WO_3$ | 0.5 | $Ni(OH)_2$ | 11 | 10.5 | 15 | 65 |
| Ex. 12 | $WO_3$ | 0.5 | $Cu(OH)_2$ | 8 | 7.5 | 25 | 75 |
| Ex. 13 | $WO_3$ | 0.5 | CuO | 10 | 9.5 | 17 | 67 |
| Ex. 14 | $WO_3$ | 0.5 | $Mg(OH)_2$ | 12 | 11.5 | 13 | 63 |
| Ex. 15 | $WO_3$ | 0.5 | $ThO_2$ | 9 | 8.5 | 20 | 70 |
| Ex. 16 | $WO_3$ | 0.5 | $Y_2O_3$ | 9 | 8.5 | 20 | 70 |
| Ex. 17 | $WO_3$ | 0.5 | ZnO | 10 | 9.5 | 17 | 67 |
| Comp. ex. 1 | — | | — | | — | 60 | 100 |
| Comp. ex. 2 | $Al_2O_3$ | 9 | $Al_2O_3$ | 9 | 0 | 60 | 105 |

Production of Lithium Secondary Positive Electrode for Batteries

Firstly, the above positive electrode active materials (Comparative examples 1 and 2; Examples 1 to 17) were mixed with acetylene black as a conductive material and an acrylic resin as a binder, in N-methyl-2-pyrrolidone, to prepare respective positive electrode slurries. The mass ratio of $LiNi_{1/3}Co_{1/3}Mn_{1/3}O_2$, acetylene black and acrylic resin was set to 94:3:3. Next, each positive electrode slurry was applied to the surface of an aluminum foil (collector) having an average thickness of 15 µm, with drying. As a result there were produced positive electrodes (Comparative examples 1 and 2; Examples 1 to 17) having a respective positive electrode mix layer on the collector.

Evaluation of Contact Angle

Firstly $LiPF_6$ as a supporting salt was dissolved, to a concentration of 1.0 M, in a mixed solvent containing ethylene carbonate (EC), dimethyl carbonate (DMC) and ethyl methyl carbonate (EMC) at a volume ratio of EC:DMC:EMC=3:3:3, to thereby prepare a liquid electrolyte (electrolyte solution). Next, the electrolyte solution prepared above was dropped onto the surface of the positive electrode mix layer of each of the above positive electrodes (Comparative examples 1 and 2; Examples 1 to 17), and a contact angle σ was measured in accordance with the sessile drop method. The results are given in Table 1.

Figure 3:
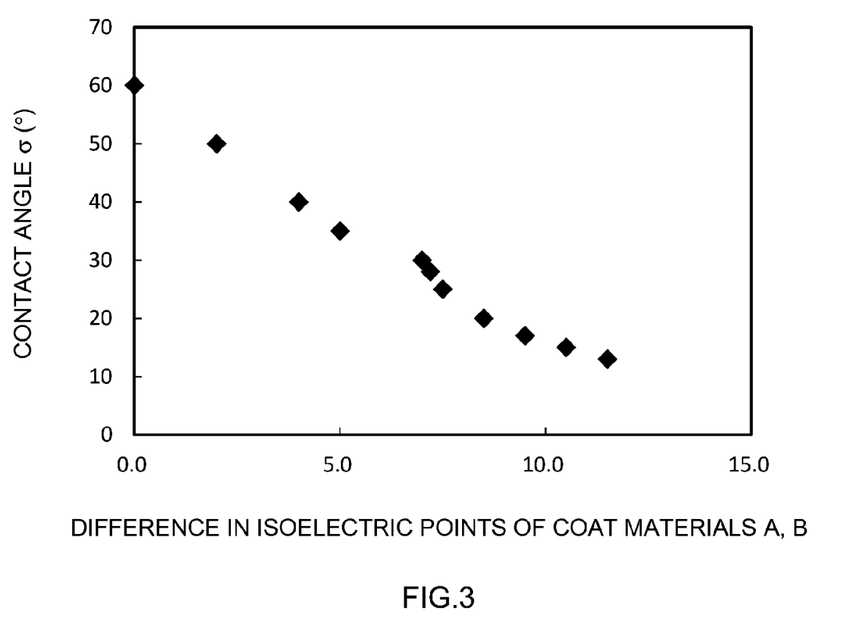
FIG. 3 is a graph illustrating a relationship between a difference in the isoelectric points of coat materials A, B and contact angle σ.

As Table 1 shows, Comparative example 1 in which $LiNi_{1/3}Co_{1/3}Mn_{1/3}O_2$ was used, as it was, as the positive electrode active material, and Comparative example 2, in which only $LiNi_{1/3}Co_{1/3}Mn_{1/3}O_2$ coated with $Al_2O_3$ was used as the positive electrode active material, exhibited a relatively large contact angle σ. In other words, wettability towards the electrolyte solution was poor. In contrast to these comparative examples, the values of contact angle σ were relatively small in Examples 1 to 17, where the positive electrode active materials were mixtures of the positive electrode active material A provided with the coat material A on the surface and the positive electrode active material B provided with the coat material B on the surface. In other words, wettability towards the electrolyte solution was improved. FIG. 3 is a graph illustrating a relationship between a difference in the isoelectric points of the coat materials A, B and contact angle σ. In FIG. 3, wettability towards the electrolyte solution rises with increasing difference in the isoelectric points of the coat materials A, B. This indicates that wettability towards the electrolyte solution is better increased by satisfying at least one of the following: using a coat material of lower isoelectric point as the coat material A; and using a coat material of higher isoelectric point as the coat material B.

Construction of Lithium Secondary Battery

Respective lithium secondary batteries were constructed using the above positive electrodes (Comparative examples 1 and 2; Examples 1 to 17). Specifically, firstly spheroidized graphite as a negative electrode active material, styrene butadiene rubber as a binder and carboxymethyl cellulose as a thickener were mixed in deionized water, to prepare a negative electrode slurry. The mass ratio of spheroidized graphite, styrene butadiene rubber and carboxymethyl cellulose was set herein to 98:1:1. Next, the negative electrode slurry was applied to the surface of a copper foil (collector) having an average thickness of 10 µm, with drying. As a result there was prepared a negative electrode having the above negative electrode mix layer on the collector.

Next, each positive electrode and the negative electrode produced above were superimposed on each other, across an interposed separator, to thereby produce a respective electrode body. A porous sheet (average thickness 20 µm) having a three-layer structure of PP/PE/PP, with a polypropylene layer formed on both surfaces of a polyethylene layer, was used herein as the separator. Each produced electrode body was accommodated in a square case, together the above electrolyte solution, and the case was sealed. Lithium secondary batteries (Comparative examples 1 and 2; Examples 1 to 17) having a battery capacity of 5 Ah were constructed thereby.

Evaluation of Output Characteristic

Firstly, each lithium secondary battery constructed above (Comparative examples 1 and 2; Examples 1 to 17) was adjusted to a state of charge (SOC) of 50%, in an environment at 25° C. The term SOC denotes herein a charged state referred to the voltage range in which the battery is ordinarily used. Next, each battery was discharged at constant current for 10 seconds at 100 Ah (20 C rate). Herein 1 C denotes a current value that allows charging to battery capacity (5 Ah) in 1 hour. A drop in battery voltage ΔV upon constant-current discharge for 10 seconds was read, and IV resistance was calculated, according to Ohm's law, on the basis of the battery voltage ΔV and the discharge current value. The results are given in Table 1. Table 1 sets out herein relative values referred to 100 as the result in Comparative example 1.

As Table 1 shows, IV resistance increased relatively in Comparative example 2, in which only $LiNi_{1/3}Co_{1/3}Mn_{1/3}O_2$ coated with $Al_2O_3$ was used as the positive electrode active material, with respect to a reference (100) being the IV resistance in Comparative example 1, in which $LiNi_{1/3}Co_{1/3}Mn_{1/3}O_2$ was used, as it was, as the positive electrode active material. A conceivable underlying reason for this is the increase in resistance derived from coating $LiNi_{1/3}Co_{1/3}Mn_{1/3}O_2$ with $Al_2O_3$.

Figure 4:
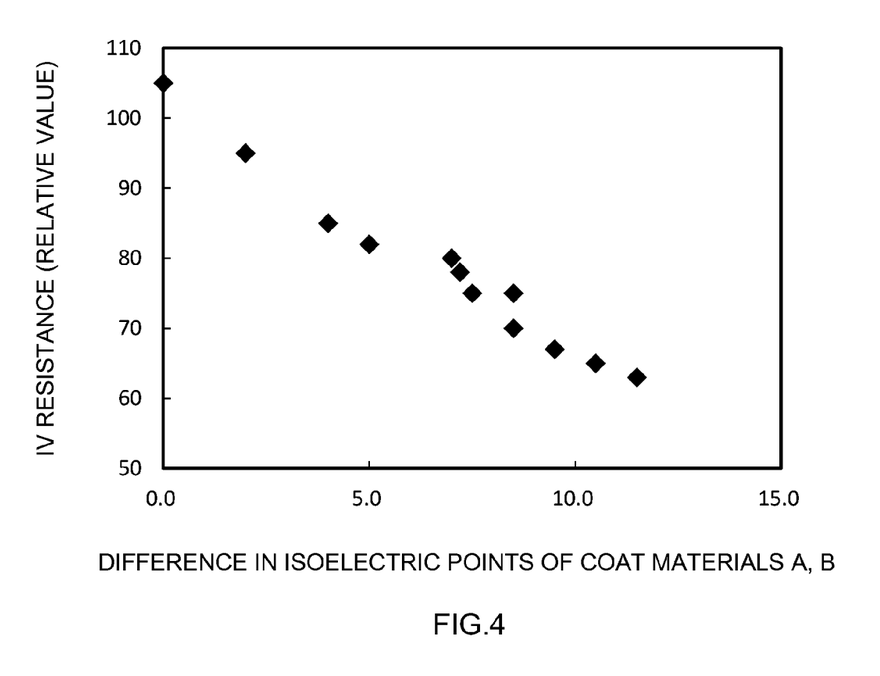
FIG. 4 is a graph illustrating a relationship between a difference in isoelectric points of coat materials A, B and IV resistance.

By contrast, IV resistance was kept relatively low in Examples 1 to 17, where the positive electrode active materials were mixtures of the positive electrode active material A provided with the coat material A on the surface and the positive electrode active material B provided with the coat material B on the surface. In other words, the output characteristic of the batteries was improved. FIG. 4 is a graph illustrating a relationship between a difference in the isoelectric points of the coat materials A, B and IV resistance. In FIG. 4, IV resistance drops and the battery output characteristic improves with increasing difference in the isoelectric points of the coat materials A, B. This indicates that the output characteristic of the battery is better enhanced by satisfying at least one of the following: using a coat material of lower isoelectric point as the coat material A; and using a coat material of higher isoelectric point as the coat material B. The above results lend support to the technical significance of the art disclosed herein.

Test Example II: Assessment of Arrangement of Active Materials A, B

Positive electrodes (Examples 18 to 21) were produced in the same way as in Example 1 in Test example I above, but herein the average particle size Db of $LiNi_{1/3}Co_{1/3}Mn_{1/3}O_2$ in the positive electrode active material B was set to vary in the range of 5 to 30 µm as given in Table 2. The contact angle was evaluated. Lithium secondary batteries (Examples 18 to 21) were constructed and the output characteristic was evaluated in the same way as in Test example I. The results are given in Table 2.

TABLE 2

| | Coat material A | | Coat material B | | Isoelectric point difference |Ib − Ia| | Active material A Average particle size Da (μm) | Active material B Average particle size Db (μm) | Particle size ratio Db/Da | Active material B P1/P3 | Contact angle σ (°) | Evaluation results IV resistance (Relative value) |
|---|---|---|---|---|---|---|---|---|---|---|---|
| | Type | Isoelectric point Ia | Type | Isoelectric point Ib | | | | | | | |
| Ex. 18 | WO$_3$ | 0.5 | Al$_2$O$_3$ | 9 | 8.5 | 10 | 20 | 2 | 4 | 20 | 60 |
| Ex. 19 | WO$_3$ | 0.5 | Al$_2$O$_3$ | 9 | 8.5 | 10 | 15 | 1.5 | 2 | 20 | 65 |
| Ex. 20 | WO$_3$ | 0.5 | Al$_2$O$_3$ | 9 | 8.5 | 10 | 5 | 0.5 | 0.5 | 20 | 80 |
| Ex. 1 | WO$_3$ | 0.5 | Al$_2$O$_3$ | 9 | 8.5 | 10 | 10 | 1 | 1 | 20 | 75 |
| Ex. 21 | WO$_3$ | 0.5 | Al$_2$O$_3$ | 9 | 8.5 | 10 | 30 | 3 | 5 | 55 | 95 |
| Comp. ex. 1 | — | — | — | — | — | 10 | 10 | 1 | 1 | 60 | 100 |

Evaluation of Uneven Distribution of Positive Electrode Active Material B

Figure 5:
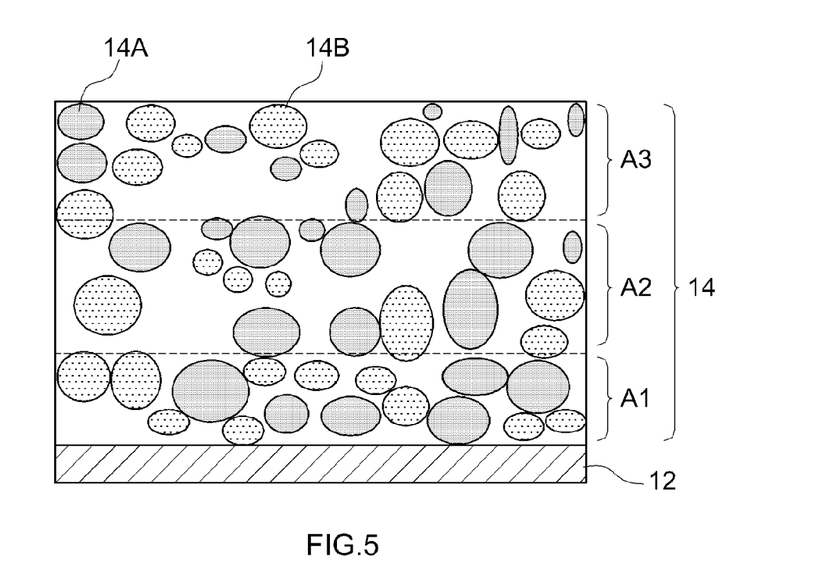
FIG. 5 is a schematic diagram illustrating a SEM-EDX mapping image of a positive electrode of Example 1.

Firstly, each positive electrode (Examples 1 and 18 to 21) was embedded in a resin, and was subjected to a cross section polisher treatment, to obtain a cross section of each positive electrode mix layer. Next, each cross section was observed under a scanning electron microscope (SEM), to obtain SEM observation images such that the entire positive electrode mix layer fitted within the field of view. Next, the obtained SEM observation images were analyzed by energy dispersive X-ray spectroscopy (EDX), and W atoms in the coat material A and Al atoms in the coat material B were mapped. For reference, FIG. 5 illustrates schematically a SEM-EDX mapping image of the positive electrode of Example 1. The reference symbols in FIG. 5 are identical to those of FIG. 1. The outer circumference of the two types of positive electrode active materials 14A, 14B are clear in the SEM-EDX mapping image. Next, the positive electrode mix layer 14 was divided equally into three layers in the thickness direction, namely a first layer A1, a second layer A2 and a third layer A3 in this order from the collector 12 side. Next, the outer peripheral length of each particle of the positive electrode active material 14B in the first layer A1 was worked out, and the obtained values were totaled, to yield a total outer peripheral distance P1. Next, the outer peripheral length of each particle of the positive electrode active material 14B in the third layer A3 was worked out, and the obtained values were totaled, to yield a total outer peripheral distance P3. Then a ratio (P1/P3) of P1 with respect to P3 was calculated. The results are given in Table 2. As an example, the value of P1 in Example 1 was calculated as 172.7 μm, P3 as 170.9 μm, and P1/P3 as 1.0 (rounded off to the first decimal).

Figure 6:
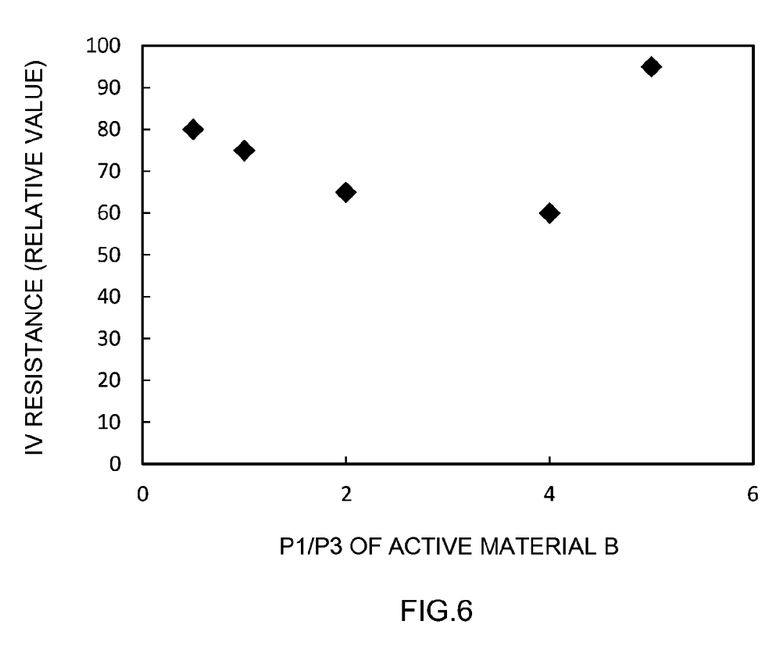
FIG. 6 is a graph illustrating a relationship between P1/P3 of an active material B and IV resistance.

FIG. 6 is a graph illustrating a relationship between P1/P3 of the active material B and IV resistance. As FIG. 6 illustrates, IV resistance was kept relatively low by prescribing P1/P3 to lie in the range of 1 to 4, and further to lie in the range of 2 to 4. In other words, the output characteristic of the batteries was improved. However, this gave way to an increase in IV resistance when P1/P3 was set to 5, as depicted concerning Example 21. The underlying reason can be conceivably ascribed to the fact that the proportion of the positive electrode active material A on the surface of the positive electrode mix layer 14 was excessively high, and charge nonuniformity was small; in other words, the forces involved in drawing charge carrier ions were weak.

Test Example III: Negative Electrode for Batteries

In Comparative example 3, spheroidized graphite (average particle size 10 μm) was prepared as a negative electrode active material. In Comparative example 3, spheroidized graphite was used, as it was, as the negative electrode active material. In Example 22, firstly spheroidized graphite (average particle size 10 μm) and a coat material A (WO$_3$) were mixed at a mass ratio of 100:0.5, and the mixture was subjected to a mechano-chemical treatment, followed by heating at 500° C. for 10 hours. As a result there was produced a negative electrode active material A. Next, spheroidized graphite (average particle size 10 μm) and a coat material B (Al$_2$O$_3$) were mixed at a mass ratio of 100:0.5, and the mixture was subjected to a mechano-chemical treatment, followed by heating at 500° C. for 10 hours. As a result there was produced a negative electrode active material B. In Example 22, the negative electrode active materials A, B produced above were mixed at a mass ratio of 1:1, and the resulting mixtures were used as a negative electrode active material.

TABLE 3

| | Coat material A | | Coat material B | | Isoelectric point difference |Ib − Ia| | Active material A Average particle size Da (μm) | Active material B Average particle size Db (μm) | P1/P3 | Contact angle σ (°) | Evaluation results IV resistance (relative value) |
|---|---|---|---|---|---|---|---|---|---|---|
| | Type | Isoelectric point Ia | Type | Isoelectric point Ib | | | | | | |
| Ex. 22 | WO$_3$ | 0.5 | Al$_2$O$_3$ | 9 | 8.5 | 10 | 10 | 1 | 25 | 85 |
| Comp. ex. 3 | — | — | — | — | — | 10 | 10 | 1 | 60 | 100 |

Negative electrodes (Example 22 and Comparative example 3) were produced in the same way as in Test example I, but using herein the above negative electrode active materials, and the contact angle σ of the produced negative electrodes was measured. Further, SEM-EDX mapping images of negative electrode cross sections, and the ratio (P1/P3) of the total outer peripheral distance P1 of the first layer A1 and the total outer peripheral distance P3 of the third layer A3 was calculated for the negative electrode active material B. The results are given in Table 3. Next, lithium secondary batteries (Example 22 and Comparative example 3) were constructed according to Test example I above, using the above negative electrodes. A positive electrode identical to that of Comparative example 1 in Test example I was used herein as the positive electrode.

Evaluation of Input Characteristic

Firstly, each lithium secondary battery constructed above (Example 22 and Comparative example 3) was adjusted to a state of charge (SOC) of 50%, in an environment at 25° C. Next, each battery was discharged at constant current for 10 seconds at 100 Ah (20 C rate). A drop in battery voltage ΔV upon constant-current discharge for 10 seconds was read, and IV resistance was calculated, according to Ohm's law, on the basis of the battery voltage ΔV and the discharge current value. The results are given in Table 3. Table 3 sets out herein relative values referred to 100 as the result in Comparative example 3.

As Table 3 reveals, the value of contact angle σ was relatively smaller in Example 22, where a mixture of the negative electrode active material A provided with the coat material A on the surface and the negative electrode active material B provided with the coat material B on the surface was used as a negative electrode active material, than was the case in Comparative example 3, where spheroidized graphite was used, as it was, as the negative electrode active material. In other words, wettability towards the electrolyte solution was improved. Further, IV resistance was kept relatively lower in Example 22 than in the case of Comparative example 3. In other words, the input characteristic of the battery was improved. From the above it follows that the art disclosed herein can be applied not only to positive electrodes but also to negative electrodes.

The present invention has been thus explained in detail, but the above embodiments are merely illustrative in nature, and the invention disclosed herein encompasses several variations and modifications of the above-described concrete examples.

The terms and expressions used herein are for description only and are not to be interpreted in a limited sense. These terms and expressions should be recognized as not excluding any equivalents to the elements shown and described herein and as allowing any modification encompassed in the scope of the claims. The preferred embodiments disclosed herein may be embodied in many various forms. This disclosure should be regarded as providing preferred embodiments of the principle of the invention. These preferred embodiments are provided with the understanding that they are not intended to limit the invention to the preferred embodiments described in the specification and/or shown in the drawings. The invention is not limited to the preferred embodiment described herein. The invention disclosed herein encompasses any of preferred embodiments including equivalent elements, modifications, deletions, combinations, improvements and/or alterations which can be recognized by a person of ordinary skill in the art based on the disclosure. The elements of each claim should be interpreted broadly based on the terms used in the claim, and should not be limited to any of the preferred embodiments described in this specification or used during the prosecution of the present application.

What is claimed is:

1. An electrode comprising:
    a collector; and
    an electrode mix layer disposed on the collector, the electrode mix layer comprising:
        an active material A provided with a core portion A and a coat material A disposed on a surface of the core portion A, and
        an active material B provided with a core portion B and a coat material B disposed on a surface of the core portion B, wherein:
    the coat material A has an isoelectric point, based on an electrophoretic method, of 7 or lower,
    the coat material B has an isoelectric point, based on the electrophoretic method, of 7 or higher,
    the isoelectric point of at least one of the coat material A and the coat material B is not 7, and
    the active material A and the active material B have different surface charge states.

2. The electrode according to claim 1, wherein an average particle size Da of the active material A and an average particle size Db of the active material B satisfy the following expression: $1 \leq (Db/Da) \leq 2$.

3. The electrode according to claim 1, wherein the isoelectric point of the coat material A is 5 or lower.

4. The electrode according to claim 1, wherein the isoelectric point of the coat material A is lower than 2.

5. The electrode according to claim 1, wherein the coat material A is selected from the group consisting of $WO_3$, $V_3O_8$, $Ta_2O_5$, and $TiO_2$.

6. The electrode according to claim 1, wherein the coat material B is selected from the group consisting of $Nb_2O_3$, $Y_2O_3$, $ThO_2$, $BeO$, $CuO$, $ZnO$, $CdO$, $AlOOH$, $Cu(OH)_2$, $Cd(OH)_2$, $Ni(OH)_2$, and $Mg(OH)_2$.

7. The electrode according to claim 1, wherein the isoelectric point of the coat material B is higher than 9.

8. The electrode according to claim 1, wherein the isoelectric point of the coat material B is 10 or higher.

9. The electrode according to claim 1, wherein a difference between the isoelectric point of the coat material A and the isoelectric point of the coat material B is 4 or greater.

10. The electrode according to claim 1, wherein a difference between the isoelectric point of the coat material A and the isoelectric point of the coat material B is 7.2 or greater.

11. The electrode according to claim 1, wherein the coat material A and the coat material B are disposed on the surfaces of the core portion A and the core portion B, respectively, in a dotted pattern.

12. The electrode according to claim 1, wherein each of the active material A and the active material B are disposed throughout an entire thickness of the electrode mix layer.

13. The electrode according to claim 1, wherein when dividing the electrode mix layer in two in a thickness direction, into an upper layer portion and a lower layer portion that is closer to the collector than the upper layer,
    the lower layer portion contains more of the active material B than of the active material A, and
    the upper layer portion contains more of the active material A than of the active material B.

14. The electrode according to claim 13, wherein at least one of the lower layer portion and the upper layer portion contains both the active material A and the active material B.

15. The electrode according to claim 1,
    wherein when dividing the electrode mix layer in three in a thickness direction, into a first layer, a second layer and a third layer, sequentially from a side facing the collector, and
    when P1 represents a total of outer peripheral lengths of the active materials B included in the first layer, and P3 represents a total of outer peripheral lengths of the active materials B included in the third layer, the P1 and the P3 satisfy the following expression:

$1 \leq (P1/P3) \leq 4$.

16. The electrode according to claim 15, wherein at least one of the first layer, the second layer, and the third layer contains both the active material A and the active material B.

17. A battery comprising the electrode according to claim 1.

* * * * *